United States Patent [19]
Lee et al.

[11] Patent Number: 5,910,296
[45] Date of Patent: Jun. 8, 1999

[54] METHOD OF PREPARING NI-M HYDROXYCARBONATE HAVING A HIGH DENSITY

[75] Inventors: Sang-won Lee, Seoul; Geun-bae Kim, Kyungki-do; Yong-chul Park; Sung-soo Kim, both of Seoul, all of Rep. of Korea

[73] Assignee: Samsung Display Devices Co., Ltd., Kyungki-do, Rep. of Korea

[21] Appl. No.: 08/962,484

[22] Filed: Oct. 31, 1997

[30] Foreign Application Priority Data

Dec. 31, 1996 [KR] Rep. of Korea ............... 96-79332

[51] Int. Cl.$^6$ ..................................... C01B 31/30
[52] U.S. Cl. ........................................... 423/420.2
[58] Field of Search ................. 423/420.2; 106/480

[56] References Cited

U.S. PATENT DOCUMENTS

| | | | |
|---|---|---|---|
| 3,912,775 | 10/1975 | Brouecker et al. | 423/420.2 |
| 4,629,626 | 12/1986 | Miyata et al. | 423/420.2 |
| 5,449,660 | 9/1995 | Munakata et al. | 423/420.2 |

*Primary Examiner*—Michael Lewis
*Assistant Examiner*—Stuart L. Hendrickson
*Attorney, Agent, or Firm*—Christie, Parker & Hale, LLP

[57] ABSTRACT

A method comprising of continuously injecting an aqueous solution of nickel salt, an aqueous solution of aluminium salt, an alkali aqueous solution and ammonia into a reactor under constant temperature, mixing the above solution and continuously withdrawing, can prepare Ni-Al hydroxycarbonate having a high density and a globular shape.

19 Claims, 2 Drawing Sheets

METHOD OF PREPARING NI-M HYDROXYCARBONATE HAVING A HIGH DENSITY

BACKGROUND OF THE INVENTION

1. Field of the Invention

The present invention relates to a method of preparing of nickel-metal hydroxycarbonate having a high density, and particularly, to a method of preparing of nickel-metal hydroxycarbonate having a high density, which can be used for preparing a cell having a high capacity and a long lifetime.

2. Description of the Related Art

Recently, with the trend to miniaturize and lighten the potable electronic machines such as camera-VTR integrated systems, audio systems and lap-top personal computers and portable phones and the like, there is a need to improve the efficiency and capacity of a cell which is used as a power source for these machines. In particular, it is desirable to lower the production cost in economical aspects.

In general, cells are classified as follows: a primary cell, such as manganese battery, an alkali battery, a mercury battery and a silver oxide battery, which are not recharged electrically and hence are discarded after discharging; a secondary cell, such as a lead storage battery, a Nil-MH (nickel-metalhydride) battery using metal hydride as a negative active material, sealed nickel-cadmium battery, a lithium-metal battery, lithium ion battery (LIB), a lithium-polymer battery (LPB), which can be recharged electrically to their original condition after use; a fuel battery; and a solar battery.

The primary cell has a disadvantage in that the cell has a low capacity, a short lifetime and is not reused. On the other hand, the secondary cell has an advantage in that the cell has a long lifetime by recharging and reusing, and has a higher voltage than a primary cell so that the cell has a high performance and efficiency, and the cell can be reused.

Among the secondary cells described above, a nickel-based cell is desirable in environmental aspects because of the highly developed recycling technology of Ni. And the capacity of an electrode plate is increased by packing amount per volume by packing an active material of paste into a multi-porous plate and alkali-resistant plate to provide a cell having a high capacity, and it is broadly used now.

Nowadays, nickel hydroxide is used as a negative active material in a nickel-based cell, and the charge-discharge reaction of the material is as follows:

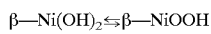

During the reversible reaction, the oxidation number of nickel changes by one (Ni(II)⇌Ni(III)). Therefore, the theoretical capacity of a cell produced by using nickel hydroxide is 289 mAh/g. However, the oxidation number of nickel changes from +2.3 to +3.0~3.7 in a real charge-discharge reaction (in redox reaction of nickel), thereby the practical capacity of the nickel-based cell varies from 200 to 400 mAh/g (70 to 140% of the theoretical value).

Regardless of above-described advantages, a high oxidation number of nickel decreases the lifetime of a cell and an electrode, causes severe self-discharge, and causes low reversibility of reaction. Therefore, the actual available capacity varies from 250 to 280 mAh/g. In a positive electrode of a nickel cell, the major reason for the electrode inferiority is due to swelling of the electrode from the expansion of the electrode volume, which happens when nickel hydroxide changes from β—NiOOH to low density γ—NiOOH. The swelling of the electrode causes separation of an active material, decrease of conductivity, and severe decrease of the lifetime and efficiency of the electrode. The low density γ—NiOOH is formed due to the compact crystalline structure of β-nickel hydroxide having a high density. The compact crystalline structure results in the decrease of the number of internal micropores. Therefore, hydrogen ions can not move smoothly in the crystalline structure. Therefore, it is necessary to prevent the formation of low density γ—NiOOH having a low density in the β—Ni(OH)$_2$⇌β—NiOOH reversible reaction, in order to improve the characteristics of an electrode.

A new material, nickel-metal hydroxycarbonate which is prepared by adding elements such as cobalt, cardmium, zinc, et al. to nickel hydroxide to substitute a part of the nickel with the element to maintain a stable α form in a strong alkali electrolyte, thereby preventing the change of β—NiOOH to γ—NiOOH. The new material, Ni-M hydroxycarbonate is used in an α—NiOOH to γ—NiOOH reversible reaction The method allows the transformation of a lattice by substituting the nickel, thereby facilitating the movement of hydrogen ions to decrease the overvoltage. Therefore, the method can effectively prevent the formation of γ—NiOOH having low density from β—NiOOH. Furthermore, a method in which the conductivity of an active material is improved by using cobalt-based oxide or other adding agents which forms an effective network in a strong alkali solution, is widely used together with the above-mentioned method.

Conventionally, a method of preparing the above nickel-metal compound is as follows: first, Ni salt is reacted with ammonia and sodium hydroxide solution to prepare Ni-Zn hydroxide. Second, Ni-Al hydroxycarbonate is prepared by forming precipitates in the form of a colloid at a pH of 8 to 11, as shown below in Reaction 1. The colloid is dried and treated to have the powder form.

[Reaction 1]

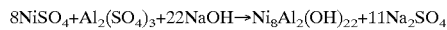

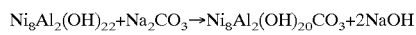

The material is used for a reversible reaction of α—Ni(OH)$_2$⇌γ—NiOOH, which has a small change of density. Furthermore, the oxidation number of nickel changes by a large amount during the reaction, that is, the number of electrons exchanged is increased. Therefore, in theory a cell prepared by using the material has a high capacity so that it can be expected to remarkably increase capacity. Furthermore, swelling of an electrode can be prevented by using the material, and therefore the lifetime of the cell can be improved. However, practically, because Ni-Al hydroxycarbonate prepared by the method has an irregular shape in the form of a colloid, the material has a low density and its shape is irregular, and it is difficult to increase the density of the material and to make it a globular shape. Therefore, when the material is used as an active material, it is very difficult to apply it to a cell because of the low density and irregular shape of the material.

SUMMARY OF THE INVENTION

In order to solve the above-mentioned problems of the conventional material, the present invention provides a method of preparing Ni-M hydroxycarbonate having a high density and a globular shape which can be packed compactly on a positive electrode plate.

In order to achieve the object, the present invention provides a method of preparing Ni-M hydroxycarbonate comprising the steps of dissolving alkali in a solution of metal salt to prepare a solution including metal; mixing said solution including metal with a solution of nickel salt and a complexing agent; and allowing said mixture to stand.

In the present invention, it is preferred that the mixing step is carried out at 0 to 35° C. When the temperature exceeds 35° C., a nucleus of metal hydride forms too quickly so that crystalline structure of the Ni-M hydroxycarbonate may not grow.

The preferred pH range of the mixture is 11 to 13. When the pH range of the mixture exceeds 13 or is less than 11, Ni-M hydroxycarbonate having a low density maybe formed.

In the method of the present invention, the metal is preferably selected from the group consisting of Al, Co, Fe, Ga, In and Mn, and most preferably, Al. Furthermore, the preferred alkali is $Na_2CO_3$, and the preferred complexing agent is ammonia.

It is preferred that the amount of metal salt is 5 to 20 mole % based on the total moles of Ni. When the amount of metal salt is less than 5 mole %, the effect of the metal salt does not occur. Moreover, when a cell is prepared with the amount of metal salt exceeding 20 mole %, the capacity of the cell decreases.

Preferably, the ratio of metal salt to alkali in this invention is less than 1:1.5.

Moreover, the preferred ratio of Ni to ammonia is less than 1:1.5. When the ratio of Ni to ammonia exceeds 1:1.5, the density of a powder prepared decreases and therefore a capacity of cell prepared by using the powder decreases.

As described above, the solution including metal comprises metal in the form of $M(OH)_4^-$. The direct addition of metal salt to the nickel salt solution results in a precipitate of $M(OH)_3$ having a low density, in the form of colloid, rather than of $M(OH)_4^-$ which should occur to prepare a product having a high density. However, in the present invention, metal is previously converted into $M(OH)_4^-$, to add to nickel salt solution. Therefore, the present invention can prevent a problem which occurs due to the formation of $M(OH)_3$ from metal.

Furthermore, the present invention provides a method of preparing Ni-M hydroxycarbonate having a high density comprising the step of continuously injecting a solution of nickel salt, a mixture of an aqueous solution of aluminium salt and an alkali aqueous solution, and ammonia in a reactor kept under a constant temperature and continuously withdrawing the resulting product while shaking.

It is preferred that the aluminum aqueous solution is prepared by dissolving Al salt in a NaOH aqueous solution so as to form $Al(OH)_4^-$.

Additional objects, advantages and novel features of the invention will set forth in part in the description which follows, and in part will become apparent to those skilled in the art upon examination of the following or may be learned by practice of the invention. The object and advantages of the invention may be realized and attained by means of the instrumentalities and combinations particular pointed out in the appended claims.

Figure 3:
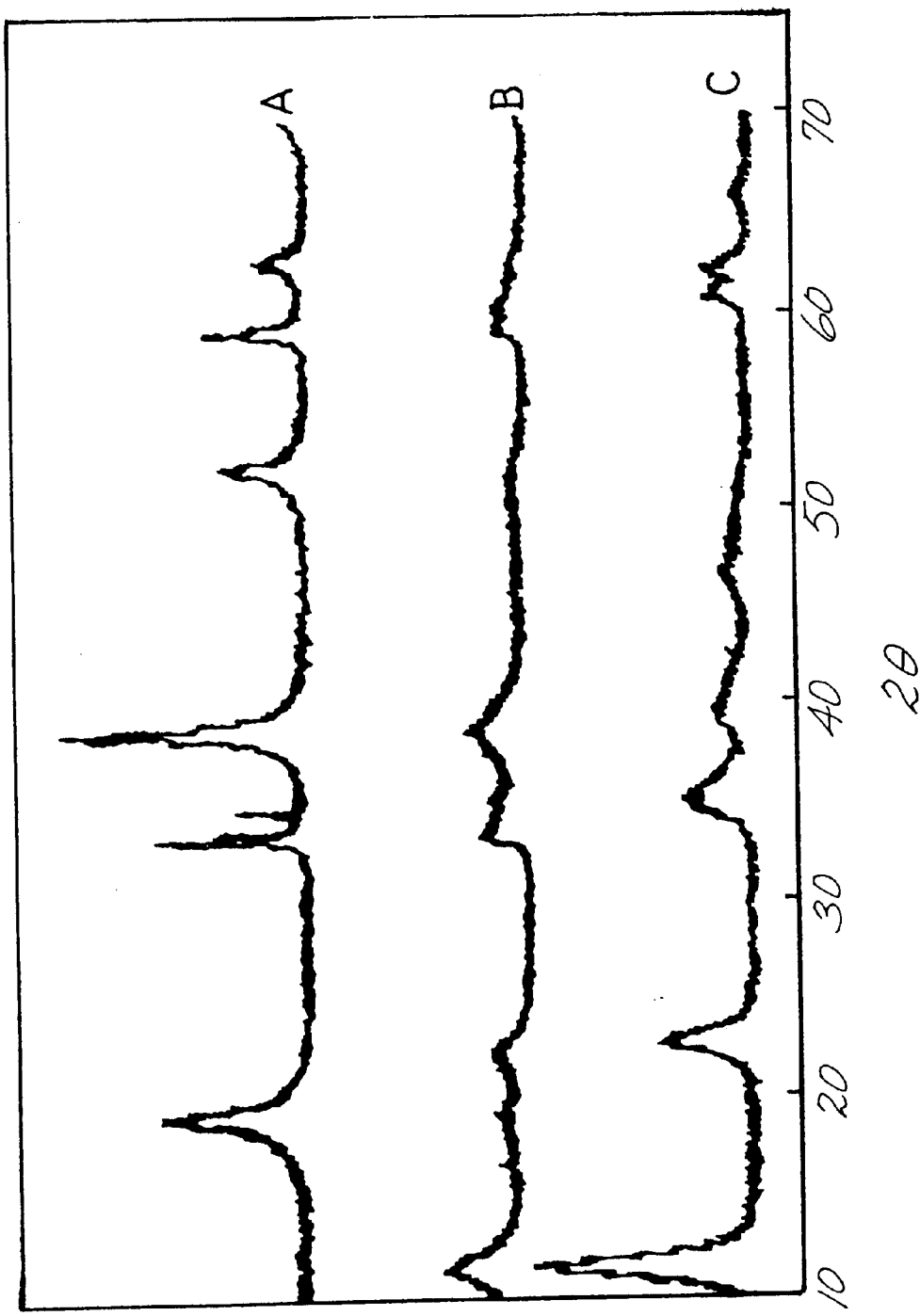
FIG. 3 is a graph showing an X-ray diffraction (XRD) of the powder prepared by this invention and the conventional method.

In the FIG. 3, graph A shows an XRD of a Ni-5% Zn hydroxide, graph B shows an XRD of a Ni-Al hydroxycarbonate prepared by the conventional method, and graph C shows an XRD of a Ni-Al hydroxycarbonate having a globular shape and a high density prepared by the method of the present invention.

In the following detailed description, only the preferred embodiment of the invention has been shown and described, simply by way of illustration of the best mode contemplated by the inventors of carrying out this invention. As will be realized, the invention is capable of modification in various obvious respects, all without departing from the scope of the invention. Accordingly, the drawing and description are to be regarded as illustrative in nature, and not as restrictive.

DETAILED DESCRIPTION OF THE PREFERRED EMBODIMENTS

The present invention is further explained in more details with reference to the following example which is within the scope of this invention.

EXAMPLE 1

999 g of $Al_2(SO_4)_3.3H_2O$ and 2000 g of NaOH were dissolved in 1000 ml of water to convert Al ion to have the form $Al(OH)_4^-$, and 413 g of $Na_2CO_3$ was added thereto to prepare an aluminium solution. The aluminium solution, 2.5M $NiSO_4$ solution and 16M ammonia solution were injected into a reactor at a rate of 7.14 ml per minute, 7.14 ml per minute and 1.1 ml per minute respectively, while maintaining the temperature of the reactor at 35° C. Thereafter, the resulting product was allowed to stand for 16 hours, while the pH was kept at 11 to 13 to prepare Ni-Al hydroxycarbanate having a globular shape, 1.52 of tapping density and 12 $\mu$m in size.

Comparative Example 1

$NiSO_4$, $Al_2(SO_4)_3$ and NaOH were mixed at a pH of 8 to 11. $Na_2CO_3$ was added to the mixture and allowed to stand to prepare a precipitate in the form of a colloid. Thereafter, the precipitate was dried to prepare Ni-Al hydroxycarbonate.

A cell was prepared by using Ni-Al hydroxycarbonate prepared by the above method, and a capacity of the cell was determined to be over 320 mAh.

Comparative Example 2

Ni salt, including 5% of Zn, was injected into a reactor with a pH 11.5 and 50° C., simultaneously with ammonia and NaOH, and Ni-Zn hydroxide was continuously extracted from the reactor.

Figure 1:
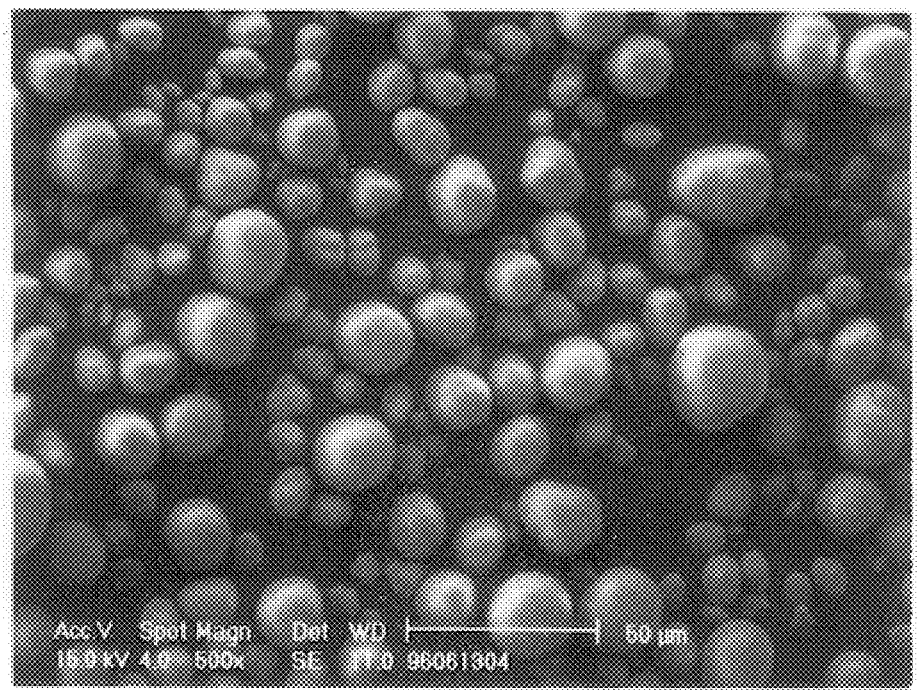
FIG. 1 is a photograph of a Ni-Al hydroxycarbonate powder in the form of a globular shape having a high density prepared by the method of the present invention.
Figure 2:
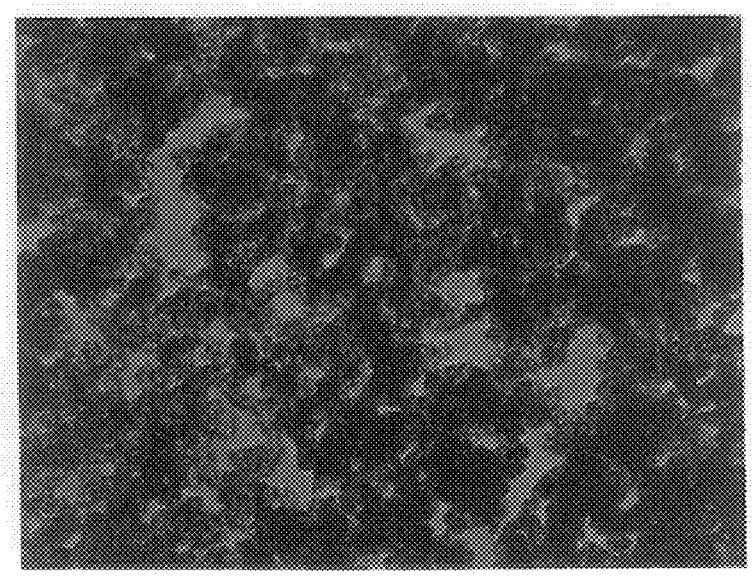
FIG. 2 is a photograph of a Ni-Al hydroxycarbonate powder prepared by a conventional method.

SEM photographs of Ni-Al hydroxycarbonate prepared by the method of Example 1 and Comparative Example 1 are shown in FIG. 1 and FIG. 2, respectively. As shown in FIG. 1 and FIG. 2, it is confirmed that a shape of Ni-Al hydroxycarbonate prepared by Example 1 is more globular shape than that of Ni-Al hydroxycabonate prepared by Comparative Example 1.

Moreover, an XRD pattern of a Ni-5% Zn hydroxide used in the conventional cell is shown in graph A of FIG. 3, and an XRD of the Ni-Al hydroxycarbonate prepared by the method of Comparative Example 1 and Example 1 are shown in graphs B and C of FIG. 3, respectively. As shown in FIG. 3, the intensity of the XRD peak (B) of the Ni-Al hydroxycarbonate prepared by the method of Comparative Example 1 is relatively low, and the intensity of the XRD peak (C) of the Ni-Al hydroxycarbonate prepared by the method of Example 1 is relatively high. The result indicates that the crystallinity of Ni-Al hydroxycarbonate of the present invention is superior to the conventional Ni-Al hydroxycarbanate. In particular, as shown in FIG. 3, Ni-Al hydroxycarbonate of the present invention has a different crystalline form (α form) compared to Ni-5% Zn hydroxide (β form) recently used.

As described above, the method of the present invention can be used to prepare Ni-Al hydroxycarbonate having a high density and globular shape. In place of conventional $Ni(OH)_2$, the Ni-Al hydroxycarbonate can be used as the positive active material. Furthermore, when a cell is prepared by using Ni-Al hydroxycarbonate according to this invention as a positive active material, the capacity of a cell can be increased and the lifetime of the cell can be increased by 15%, in comparison with the conventional cell prepared by using Ni-Zn. Moreover, when the cell of this invention and the conventional cell were charged-discharged at a high rate, the capacity of these cells are as follows. In 3C charge and 0.2C discharge, the capacity of the cell prepared by using Ni-Zn became less than 80% of the initial capacity at 104 cycles, while the capacity of the cell prepared by using Ni-Al hydroxycarbonate became less than 80% of the initial capacity at 120 cycles. Therefore, the cell of the present invention can be charged-discharged at a high rate.

What is claimed is:

1. A method of preparing Ni-metal (Ni-M) hydroxycarbonate comprising the steps of:
   dissolving an alkali in a solution of a metal salt to prepare a solution including metal;
   mixing said solution with a solution of nickel salt and a complexing agent to form a mixture; and
   allowing said mixture to stand, and recovering said hydroxycarbonate.

2. The method of preparing Ni-M hydroxycarbonate as claimed in claim 1 wherein the mixing step is carried out at 0 to 35° C.

3. The method of preparing Ni-M hydroxycarbonate as claimed in claim 1 wherein the pH of the mixture is adjusted to a pH of from 11 to 13.

4. The method of preparing Ni-M hydroxycarbonate as claimed in claim 1 wherein the metal is selected from the group consisting of Al, Co, Fe, Ga, In and Mn.

5. The method of preparing Ni-M hydroxycarbonate as claimed in claim 4 wherein the metal is Al.

6. The method of preparing Ni-M hydroxycarbonate as claimed in claim 1 wherein the alkali is $Na_2CO_3$.

7. The method of preparing Ni-M hydroxycarbonate as claimed in claim 1 wherein the complexing agent is ammonia.

8. The method of preparing Ni-M hydroxycarbonate as claimed in claim 1 wherein the amount of metal salt to be used is from 5 to 20 mole % based on the total moles of Ni.

9. The method of preparing Ni-M hydroxycarbonate as claimed in claim 1 wherein the mole ratio of the metal salt to alkali is less than 1:1.5.

10. The method of preparing Ni-M hydroxycarbonate as claimed in claim 1 wherein the mole ratio of Ni to complexing agent is less than 1:1.5.

11. A method of preparing Ni-Al hydroxycarbonate comprising the steps of:
    continuously injecting an aqueous solution of nickel salt, a mixture of an aqueous solution of aluminium salt and an alkali aqueous solution, and ammonia in a reactor kept under a constant temperature; and
    continuously withdrawing said hydroxycarbonate while shaking.

12. The method of preparing Ni-Al hydroxycarbonate as claimed in claim 11 wherein the aqueous solution of aluminium salt comprises Al in the form of $Al(OH)_4^-$.

13. The method of preparing Ni-Al hydroxycarbonate as claimed in claim 11 wherein the aqueous solution of aluminium salt is prepared by dissolving Al salt in an aqueous solution of NaOH.

14. The method of preparing Ni-Al hydroxycarbonate as claimed in claim 11 wherein the amount of aluminum is 5 to 20 mole % based on the total moles of Ni.

15. The method of preparing Ni-Al hydroxycarbonate as claimed in claim 11 wherein the mole ratio of aluminium salt to alkali is less than 1:1.5.

16. The method of preparing Ni-Al hydroxycarbonate as claimed in claim 11 wherein the mole ratio of Ni to ammonia is less than 1:1.5.

17. The method of preparing Ni-Al hydroxycarbonate as claimed in claim 11 wherein the temperature of the reactor is from 0 to 35° C.

18. A powder nickel-metal hydroxycarbonate having a globular shape and a tapping density of 1.5.

19. A powder Ni-Al hydroxycarbonate having a globular shape and a tapping density of 1.5.

* * * * *